Oct. 23, 1945.  L. J. HIBBARD  2,387,262

CONTROL SYSTEM

Filed Aug. 25, 1944   3 Sheets-Sheet 1

WITNESSES:
E.A. McCloskey.
J.A. Chilcott

INVENTOR
Lloyd J. Hibbard.
BY G.M. Crawford
ATTORNEY

Oct. 23, 1945.  L. J. HIBBARD  2,387,262
CONTROL SYSTEM
Filed Aug. 25, 1944  3 Sheets-Sheet 2

Sequence of Switches

| Notch | 1 | 2 | 3 | 4 | 5 | 6 | 7 | 8 | 9 | 10 | 11 | 12 | 13 | 14 | E | F | Motor Volts | Transformer B | C | D |
|---|---|---|---|---|---|---|---|---|---|---|---|---|---|---|---|---|---|---|---|---|
| 1 | O |   |   |   |   | O | O | O |   |   | O | O |   |   | O |   | 360 | Decreasing Buck | Steady Buck | Steady Boost |
| 2 | O | O |   |   |   |   | O | O |   |   | O | O |   |   | O |   | 381 | | | |
| 3 |   | O |   |   |   | O | O | O |   |   | O | O |   |   | O |   | 402 | | | |
| 4 |   | O | O |   |   |   | O | O |   |   | O | O |   |   | O |   | 423 | | | |
| 5 |   |   | O |   |   | O | O | O |   |   | O | O |   |   | O |   | 444 | | | |
| 6 |   |   | O | O |   |   | O | O |   |   | O | O |   |   | O |   | 465 | | | |
| 7 |   |   |   | O |   | O | O | O |   |   | O | O |   |   | O |   | 486 | | | |
| 8 |   |   |   | O | O |   | O | O |   |   | O | O |   |   | O |   | 507 | | | |
| 9 |   |   |   |   | O |   | O | O | O |   | O | O |   |   | O |   | 526⅔ | | | |
| 9a |   |   |   |   | O | O | O | O | O | O |   |   |   |   | O |   | | Reverse Primary of B | | |
| 9b |   |   |   |   | O | O |   |   | O | O |   |   |   |   | O |   | | | | |
| 10 |   |   | O | O |   |   | O | O | O |   |   | O | O |   | O |   | 547 | Increasing Boost | Steady Buck | Steady Boost |
| 11 |   |   | O |   | O |   | O | O | O |   |   | O | O |   | O |   | 568 | | | |
| 12 |   |   | O | O |   |   | O | O | O |   |   | O | O |   | O |   | 589 | | | |
| 13 |   |   | O |   | O |   | O | O | O |   |   | O | O |   | O |   | 610 | | | |
| 14 |   |   | O | O |   |   | O | O | O |   |   | O | O |   | O |   | 631 | | | |
| 15 |   | O |   |   | O |   | O | O | O |   |   | O | O |   | O |   | 652 | | | |
| 16 | O | O |   |   |   |   | O | O | O |   |   | O | O |   | O |   | 673 | | | |
| 17 | O |   |   |   | O |   | O | O | O |   |   | O | O |   | O |   | 693⅓ | | | |
| 17a | O |   |   |   |   | O |   | O | O | O |   |   | O |   | O | O | | Disconnect C from trolley and parallel with B | | |
| 17b | O |   |   |   |   | O |   |   | O | O |   |   | O |   |   | O | | | | |
| 18 | O | O |   |   |   |   | O | O | O |   |   |   | O |   |   | O | 714 | Decreasing Boost | Decreasing Buck | Steady Boost |
| 19 |   | O |   |   | O |   | O | O | O |   |   |   | O |   |   | O | 735 | | | |
| 20 |   | O | O |   |   |   | O | O | O |   |   |   | O |   |   | O | 756 | | | |
| 21 |   |   | O |   | O |   | O | O | O |   |   |   | O |   |   | O | 777 | | | |
| 22 |   |   | O | O |   |   | O | O | O |   |   |   | O |   |   | O | 798 | | | |
| 23 |   |   |   | O | O |   | O | O | O |   |   |   | O |   |   | O | 819 | | | |
| 24 |   |   |   | O | O |   | O | O | O |   |   |   | O |   |   | O | 840 | | | |
| 25 |   |   |   |   | O |   | O | O | O |   |   |   | O |   |   | O | 860 | | | |
| 25a |   |   |   | O | O | O | O | O | O | O |   | O | O |   |   | O | | Reverse B and C Primary windings | | |
| 25b |   |   |   | O | O | O |   |   | O | O |   | O | O |   |   | O | | | | |
| 26 |   |   | O | O |   |   | O | O |   |   |   | O | O |   |   | O | 881 | Increasing Buck | Increasing Boost | Steady Boost |
| 27 |   |   | O |   | O |   | O | O |   |   |   | O | O |   |   | O | 902 | | | |
| 28 |   | O | O |   |   |   | O | O |   |   |   | O | O |   |   | O | 923 | | | |
| 29 |   | O |   |   | O |   | O | O |   |   |   | O | O |   |   | O | 944 | | | |
| 30 |   | O | O |   |   |   | O | O |   |   |   | O | O |   |   | O | 965 | | | |
| 31 |   | O |   |   | O |   | O | O |   |   |   | O | O |   |   | O | 986 | | | |
| 32 | O | O |   |   |   |   | O | O |   |   |   | O | O |   |   | O | 1007 | | | |
| 33 | O |   |   |   | O |   | O | O |   |   |   | O | O |   |   | O | 1026⅔ | | | |
| 33a | O |   |   |   |   | O | O | O |   |   |   | O | O | O |   | O | | Disconnect C from B Connect C to trolley (Boost) | | |
| 33b | O |   |   |   |   | O |   |   |   |   |   | O | O | O |   | O | | | | |
| 34 | O | O |   |   |   |   | O | O |   |   |   | O | O | O |   | O | 1047 | Decreasing Buck | Steady Boost | Steady Boost |
| 35 |   | O |   |   | O |   | O | O |   |   |   | O | O | O |   | O | 1068 | | | |
| 36 |   | O | O |   |   |   | O | O |   |   |   | O | O | O |   | O | 1089 | | | |
| 37 |   |   | O |   | O |   | O | O |   |   |   | O | O | O |   | O | 1110 | | | |
| 38 |   |   | O | O |   |   | O | O |   |   |   | O | O | O |   | O | 1131 | | | |
| 39 |   |   |   | O | O |   | O | O |   |   |   | O | O | O |   | O | 1152 | | | |
| 40 |   |   |   | O | O |   | O | O |   |   |   | O | O | O |   | O | 1173 | | | |
| 41 |   |   |   |   | O |   | O | O |   |   |   | O | O | O |   | O | 1193⅓ | | | |
| 41a |   |   |   | O | O | O | O | O |   |   |   | O | O | O |   | O | | Reverse Primary of B | | |
| 41b |   |   |   | O | O |   |   |   |   |   |   | O | O | O |   | O | | | | |
| 42 |   |   | O | O |   |   | O | O |   |   |   | O | O | O |   | O | 1214 | Increasing Boost | Steady Boost | Steady Boost |
| 43 |   |   | O |   | O |   | O | O |   |   |   | O | O | O |   | O | 1235 | | | |
| 44 |   | O | O |   |   |   | O | O |   |   |   | O | O | O |   | O | 1256 | | | |
| 45 |   | O |   |   | O |   | O | O |   |   |   | O | O | O |   | O | 1277 | | | |
| 46 | O | O |   |   |   |   | O | O |   |   |   | O | O | O |   | O | 1298 | | | |
| 47 | O |   |   |   | O |   | O | O |   |   |   | O | O | O |   | O | 1319 | | | |
| 48 | O | O |   |   |   |   | O | O |   |   |   | O | O | O |   | O | 1340 | | | |
| 49 | O |   |   |   | O |   | O | O |   |   |   | O | O | O |   | O | 1360 | | | |

WITNESSES:
E. A. McCloskey
W. S. Ch. Elliott

Fig. 3

INVENTOR
Lloyd J. Hibbard.
BY Geo. W. Crawford
ATTORNEY

Oct. 23, 1945.    L. J. HIBBARD    2,387,262
CONTROL SYSTEM
Filed Aug. 25, 1944    3 Sheets-Sheet 3

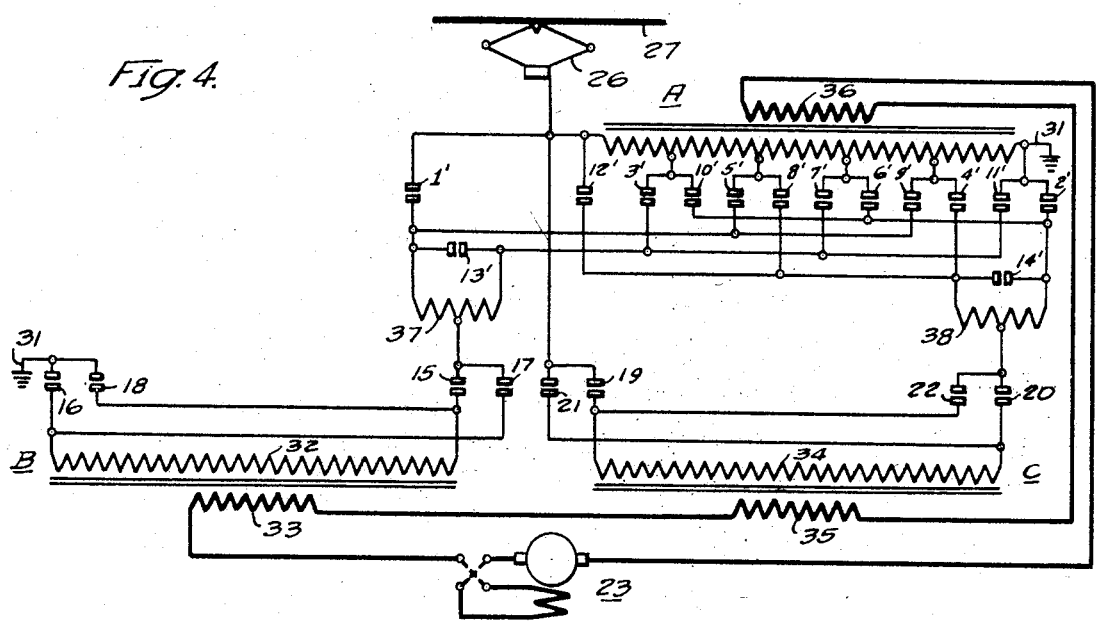

| Notch | Switches | | | | | | | | | | | | | | | | | | | | | |
|---|---|---|---|---|---|---|---|---|---|---|---|---|---|---|---|---|---|---|---|---|---|---|
| | 1' | 2' | 3' | 4' | 5' | 6' | 7' | 8' | 9' | 10' | 11' | 12' | 13' | 14' | 15 | 16 | 17 | 18 | 19 | 20 | 21 | 22 |
| 1 | O | O | | | | | | | | | | | O | O | O | | O | | | O | O | |
| 2 | O | O | O | | | | | | | | | | | O | O | | O | | | O | O | |
| 3 | O | O | O | O | | | | | | | | | | O | O | | O | | | O | O | |
| 4 | | O | O | O | | | | | | | | | | O | O | | O | | | O | O | |
| 5 | | | O | O | | | | | | | | | | O | O | O | O | | | O | O | |
| 6 | | | O | O | O | | | | | | | | | O | O | | O | | | O | O | |
| 7 | | | O | O | O | O | | | | | | | | O | O | | O | | | O | O | |
| 8 | | | | O | O | O | | | | | | | O | | O | O | O | | | O | O | |
| 9 | | | | | O | O | | | | | | | | O | O | O | O | | | O | O | |
| 10 | | | | | O | O | O | | | | | | | O | O | O | O | | | O | O | |
| 11 | | | | | O | O | O | O | | | | | | O | O | | O | | | O | O | |
| 12 | | | | | | O | O | O | | | | | O | | O | O | O | | | O | O | |
| 13 | | | | | | | O | O | | | | | | O | O | O | O | | | O | O | |
| 14 | | | | | | | O | O | O | | | | | O | O | O | O | | | O | O | |
| 15 | | | | | | | O | O | O | O | | | | O | O | | O | | | O | O | |
| 16 | | | | | | | | O | O | O | | | O | | O | O | O | | | O | O | |
| 17 | | | | | | | | | O | O | | | | O | O | O | O | | | O | O | |
| 18 | | | | | | | | | O | O | O | | | O | O | O | O | | | O | O | |
| 19 | | | | | | | | | O | O | O | O | | O | O | | O | | | O | O | |
| 20 | | | | | | | | | | O | O | O | O | | O | O | O | | | O | O | |
| 21 | | | | | | | | | | | O | O | O | O | O | O | O | | | O | O | |
| 21a | | | | | | | | | | | O | O | O | O | O | O | O | O | O | O | O | O |
| 21b | | | | | | | | | | | | O | O | O | O | | | O | O | O | O | O |
| 22 | | | | | | | | | | | O | O | O | O | O | | | O | O | O | O | O |
| 23 | | | | | | | | | | O | O | O | O | | | | O | O | O | O | O | O |
| 24 | | | | | | | | | | O | O | O | | | O | | | O | O | O | O | O |
| 25 | | | | | | | | | O | O | O | | | | O | | O | O | O | O | O | O |
| 26 | | | | | | | | O | O | O | | | | O | | | O | O | O | O | O | O |
| 27 | | | | | | | | O | O | O | O | | | | O | | | O | O | O | O | O |
| 28 | | | | | | | O | O | O | | | | | O | | | O | O | O | O | O | O |
| 29 | | | | | | | O | O | O | | | | | | | O | O | O | O | O | O | O |
| 30 | | | | | | O | O | O | O | | | | | O | | | O | O | O | O | O | O |
| 31 | | | | | O | O | O | O | | | | | | | | O | O | O | O | O | O | O |
| 32 | | | | | O | O | O | | | | | | | O | | | O | O | O | O | O | O |
| 33 | | | | | O | O | | | | | | | | | | O | O | O | O | O | O | O |
| 34 | | | | O | O | O | | | | | | | | O | | | O | O | O | O | O | O |
| 35 | | | | O | O | O | O | | | | | | | | | O | O | O | O | O | O | O |
| 36 | | | O | O | O | | | | | | | | | O | | | O | O | O | O | O | O |
| 37 | | | O | O | | | | | | | | | | | | O | O | O | O | O | O | O |
| 38 | | O | O | O | | | | | | | | | | O | | | O | O | O | O | O | O |
| 39 | O | O | O | O | | | | | | | | | | | | O | O | O | O | O | O | O |
| 40 | O | O | O | | | | | | | | | | | O | | | O | O | O | O | O | O |
| 41 | O | O | | | | | | | | | | | | | | O | O | O | O | O | O | O |

WITNESSES:
C.A.M.Clonkey
T.S.Cliniott

INVENTOR
Lloyd J. Hibbard.
BY T.M.Crawford
ATTORNEY

Patented Oct. 23, 1945

2,387,262

UNITED STATES PATENT OFFICE 2,387,262

CONTROL SYSTEM

Lloyd J. Hibbard, Forest Hills, Pa., assignor to Westinghouse Electric Corporation, East Pittsburgh, Pa., a corporation of Pennsylvania Application August 25, 1944, Serial No. 551,129

10 Claims. (Cl. 171—119)

My invention relates, generally, to control systems and, more particularly, to systems for controlling the operation of electric locomotives and the like.

At the present time the tendency in the design of electric locomotives is to increase the amount of power in each unit. When low voltage alternating current motors of the series-commutator type are utilized large amounts of current must be supplied to the motors, particularly during the accelerating cycle when the voltage applied to the motors is gradually increased by changing taps on a power transformer. The present practice in this country is to provide a large number of taps on the secondary winding of the power transformer and connect the taps to the traction motors by means of heavy, high current capacity switches which are operated in sequential relation.

A few installations have been made in Europe in which the tap-changing switches are connected to the high voltage primary winding of the power transformer, thereby decreasing the required current capacity of the switches, but, of course, requiring that the switches be insulated to withstand the high voltage on the primary winding. The European schemes require a large number of high voltage taps for satisfactory operation of the locomotive, thereby requiring a large number of high voltage switches and also making the transformer difficult and expensive to build.

An object of my invention, generally stated, is to provide a locomotive control system which shall be simple and efficient in operation and which may be economically manufactured and installed.

A more specific object of my invention is to provide a high tension notching system which requires a relatively small number of taps on a transformer for a relatively large number of accelerating steps or notches.

Another object of my invention is to provide a high tension notching system which is more compact, lighter and cheaper than prior systems.

Other objects of my invention will be explained fully hereinafter or will be apparent to those skilled in the art.

In accordance with my invention, the secondary windings of a plurality of transformers are connected in series-circuit relation across the traction motors of a locomotive. The primary windings of these transformers are so connected that the secondary windings are first in differential and then in cumulative relation. A regulating transformer is provided with a plurality of high-tension taps which are connected to the primary windings by tap-changing switches operable in sequential relation.

For a fuller understanding of the nature and objects of my invention, reference may be had to the following detailed description, taken in conjunction with the accompanying drawings, in which:

Fig. 3 is a chart showing the sequence of operation of certain of the switches illustrated in Figs. 1 and 2;

Fig. 4 is a schematic diagram of another modification of the invention; and

Fig. 5 is a sequence chart for Fig. 4.

Figure 1:
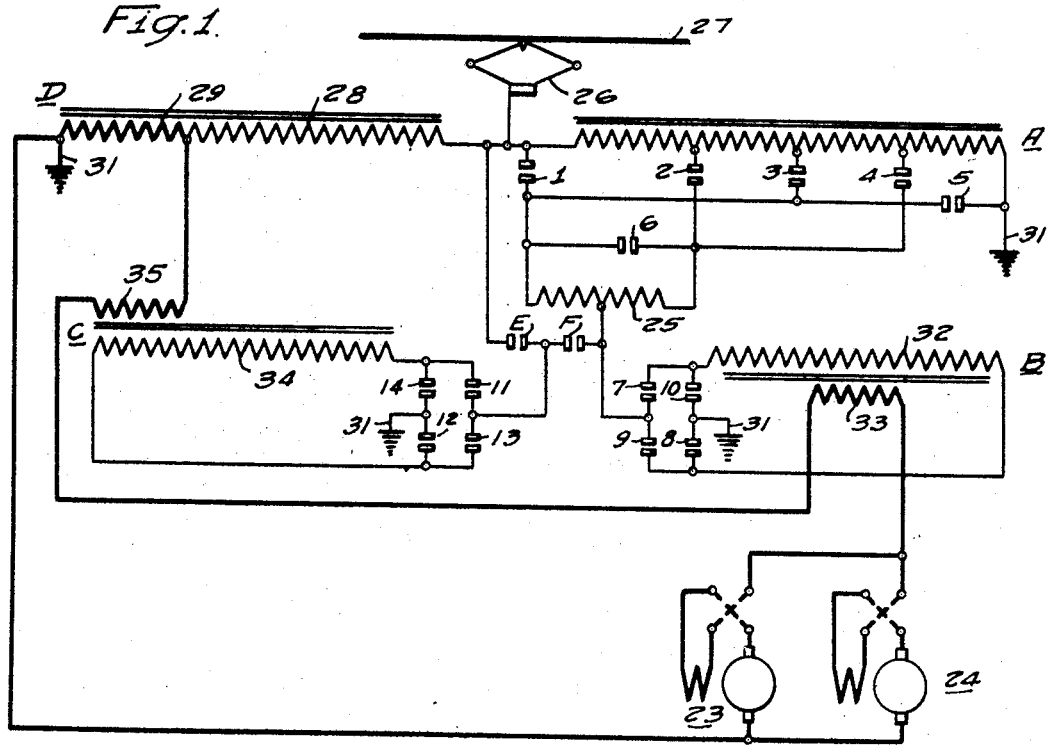
Figure 1 is a schematic diagram of a control system embodying the principal features of my invention.

Referring to the drawings, and particularly to Figure 1, the system shown therein comprises a pair of motors 23 and 24 which may be of a type suitable for propelling an electric locomotive (not shown); a regulating transformer A; a pair of buck-boost transformers B and C; an auto transformer D; a plurality of tap-changing switches 1-5, inclusive, for connecting the buck-boost transformers B and C to taps on the winding of the regulating transformer A; a preventive coil 25 which functions in the usual manner to prevent short-circuiting portions of the transformer winding during the tap-changing operation; a switch 6 which is closed periodically during the switching operations to balance the voltage across the preventive coil 25; a pair of switches E and F for changing the connections to the buck-boost transformers B and C; reversing switches 7 to 10, inclusive, for reversing the polarity of the buck-boost transformer B, and reversing switches 11 to 14, inclusive, for reversing the polarity of the buck-boost transformer C. The regulating transformer A and the auto transformer D may be connected by means of a pantograph collector 26 to an overhead trolley conductor 27 which may be energized from any suitable source of power (not shown).

As shown, the winding of the transformer D is divided into a high tension portion 28 and a low tension portion 29. The windings of the regulating transformer A and the transformer D are connected to ground at 31. The buck-boost transformer B is provided with a primary winding 32 and a secondary winding 33. Likewise, the buck-boost transformer C is provided with a primary winding 34 and a secondary winding 35.

The secondary windings 33 and 35 of the transformers B and C, respectively, and the low tension winding 29 of the auto transformer D are connected in series-circuit relation in the circuit for the motors 23 and 24 which are connected in parallel-circuit relation. The polarity of the transformers B and C may be reversed to cause the variable voltage of the secondary winding of these transformers to be either subtracted from or added to a fixed voltage obtained from the low tension winding of the transformer D during the acceleration of the motors 23 and 24, as will be explained more fully hereinafter. The voltage of the secondary windings 33 and 35 may be varied by closing the tap-changing switches 1 to 5 in a predetermined sequence, thereby gradually increasing the motor voltage to accelerate the motors.

In order that the functioning of the foregoing apparatus may be more clearly understood, the operation of the system will now be described in more detail. Assuming that the switch E is closed, the switch F is open and the reversing switches 7, 8, 11, and 12 are closed, as indicated in the sequence chart shown in Fig. 3, the switches 1 and 6 may be closed to apply maximum excitation to the buck-boost transformer B. Since the transformers C and D are both connected directly across the power source, maximum excitation is also applied to these transformers.

Assuming also that the polarity of the transformers B and C is such that the voltage of their secondary windings 33 and 35 opposes the voltage of the low tension winding 29 of the auto transformer D when the reversing switches 7, 8, 11, and 12 are closed it will be seen that minimum voltage is applied to the motors 23 and 24. By way of example, it may be assumed that the voltage of the winding 29 is 860 volts, and that the voltage of the winding 33 is 166⅔ volts, and the voltage of the winding 35 is 333⅓ volts when maximum excitation is applied to the primary windings of these transformers. Thus, as indicated in the sequence chart, the minimum motor voltage is 360 volts.

The voltage of the transformer B may be gradually decreased by closing the tap-changing switches 2 to 5 in sequential relation, thereby gradually increasing the motor voltage, as indicated in the sequence chart. When the switch 5 is closed, the reversing switches 9 and 10 may be closed and the switches 7 and 8 opened to reverse the polarity of the transformer B. Thus, the transformer B becomes a boosting transformer instead of a bucking transformer.

The voltage of the transformer B may then be gradually increased by closing the switches 4 to 1 in reverse sequence, as indicated in the sequence chart. Since the voltage of the transformer B is now being added to the motor voltage, it is gradually increased.

When the switch 1 is closed, the switch E may be opened and the switch F closed to disconnect the transformer C from the trolley and connect it in parallel-circuit relation with the transformer B. The voltage of both transformers B and C may then be gradually decreased by closing the tap-changing switches 2 to 5, as indicated in the sequence chart.

At this time the reversing switches 7, 8, 13, and 14 may be closed and the switches 9, 10, 11, and 12 opened to reverse the polarities of both transformers B and C. Thus, transformer B becomes a bucking transformer and transformer C becomes a boosting transformer. The voltage of these transformers may then be gradually increased by closing the switches 4 to 1 in reverse sequence.

The switch F may then be opened and the switch E closed to disconnect the transformer C from the transformer B and reconnect it to the trolley. The voltage of the transformer B may then be gradually decreased by closing the switches 2 to 5 in sequential relation. The voltage of the transformer C remains fixed and is in cumulative relation with the voltage of the transformer D.

The reversing switches 7 and 8 may then be opened and the switches 9 and 10 closed to reverse the polarity of the transformer D, thereby changing it from a bucking to a boosting transformer. The voltage of the transformer B may then be gradually increased by closing the switches 4 to 1 in reverse sequence, thereby gradually increasing the motor voltage to a maximum of 1360 volts, as indicated in the sequence chart.

In this manner the motor voltage is gradually increased from a minimum to a maximum in relatively small steps. Furthermore, a relatively large number of steps are obtained with a small number of tap-changing switches and a small number of taps on the high tension winding of the regulating transformer A.

Figure 2:
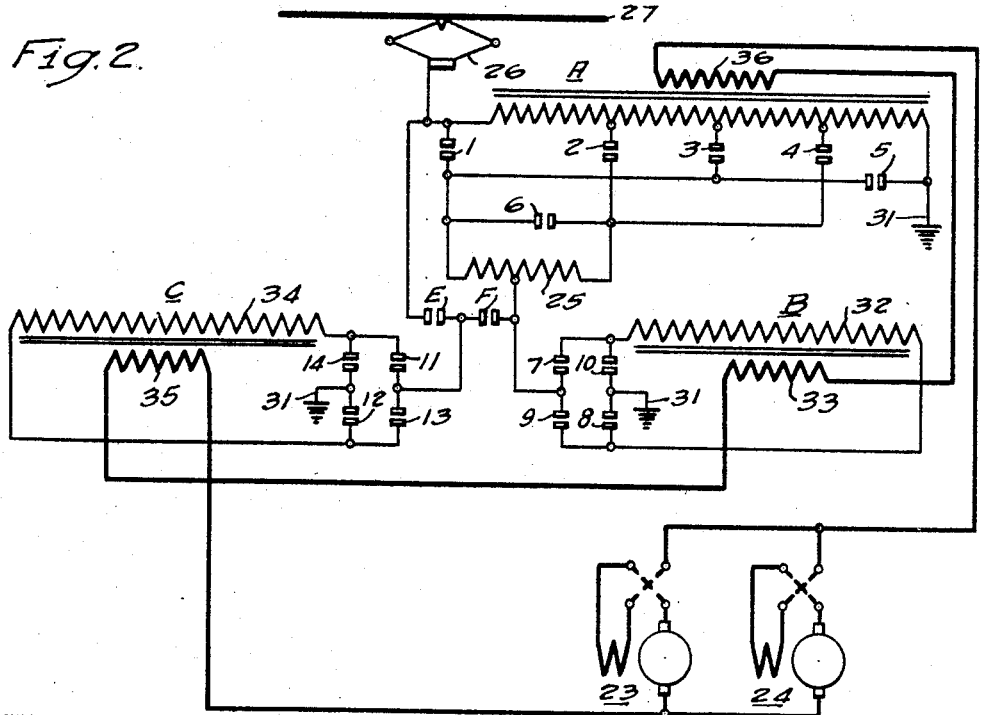
Fig. 2 is a schematic diagram of a modification of the invention.

The system shown in Figure 2 is similar to that shown in Figure 1 with the exception that the transformer D is omitted and the transformer A is provided with a secondary winding 36. The winding 36 is connected in the motor circuit in series-circuit relation with the secondary windings 33 and 35 of the transformers B and C, respectively. The voltage of the secondary winding 36 remains fixed during the accelerating cycle, and it may be assumed that the voltage of this winding is the same as that of the low tension winding 29 of the transformer D, shown in Figure 1. Accordingly, the sequence chart, shown in Figure 3, will apply to the system shown in Figure 2, and the motor voltage may be gradually increased by operating the tap-changing switches, the reversing switches and the transformer connecting switches E and F in the manner indicated in the sequence chart.

In the system shown in Figure 4, a greater number of tap-changing switches 1' to 12' are provided than in the system shown in Figures 1 and 2. As shown, two tap-changing switches are connected to each tap on the primary winding of the regulating transformer A. One-half of the tap-changing switches are connected to the primary winding 32 of the transformer B through a preventive coil 37 and reversing switches 15 to 18, inclusive. The other half of the tap-changing switches are connected to the primary winding 34 of the transformer C through a preventive coil 38 and reversing switches 19 to 22, inclusive. Switches 13' and 14' are provided for balancing the voltage across the preventive coils 37 and 38, respectively, during the switching operations.

The secondary winding 36 of the regulating transformer A is connected in the motor circuit in series-circuit relation with the secondary windings 33 and 35 of the transformers B and C, respectively. The voltage of the transformer A remains fixed during the accelerating period. The voltage of the transformers B and C may be varied in the manner hereinbefore described by operating the tap-changing switches in sequential relation, as indicated in the sequence chart shown in Figure 5.

During the first part of the accelerating cycle, the transformers B and C both function as bucking transformers, and their voltage is gradually decreased, thereby gradually increasing the motor voltage. When the switches 11', 12', 13', and 14' are closed, zero voltage is applied to the transformers B and C, and the reversing switches 15 to 22 are then operated to reverse the polarity of these transformers, thereby changing them from bucking to boosting transformers. The voltage of these transformers is then gradually increased by operating the tap-changing switches 12' to 1' in reverse sequence, as indicated in the sequence chart. In this manner the voltage is gradually increased, and maximum voltage is applied to the motor 23.

From the foregoing description it is apparent that I have provided a system for gradually increasing the voltage applied to alternating current motors during an accelerating cycle. The various schemes herein described require a relatively small number of taps on the high tension winding of a regulating transformer, thereby simplifying the design and construction of the transformer.

Furthermore, a relatively small number of high tension switches are required, thereby decreasing the size, weight, and cost of the equipment in an electric locomotive or similar vehicle. A relatively large number of steps or notches are provided, thereby insuring smooth operation of the locomotive during the accelerating cycle and reducing the tendency of the motors to slip the driving wheels.

Since numerous changes may be made in the above-described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a control system, in combination, a regulating transformer having a plurality of taps on the high tension winding thereof, a plurality of buck-boost transformers having primary windings and secondary windings, a plurality of tap-changing switches operable in sequential relation to connect said primary windings to said high tension taps in a predetermined sequence to vary the voltage of the secondary windings, and means for causing said secondary windings to be connected first in differential-series and then in cumulative-series relation.

2. In a control system, in combination, a regulating transformer having a plurality of taps on the high tension winding thereof, a plurality of buck-boost transformers having primary windings and secondary windings, a plurality of tap-changing switches operable in sequential relation to connect said primary windings to said high tension taps in a predetermined sequence to vary the voltage of the secondary windings, and means for causing the variable voltage of the secondary windings to be either subtracted from or added to a fixed voltage.

3. In a control system, in combination, a regulating transformer having a plurality of taps on the high tension winding thereof, a plurality of buck-boost transformers having primary windings and secondary windings, a plurality of tap-changing switches operable in sequential relation to connect said primary windings to said high tension taps in a predetermined sequence to vary the voltage of the secondary windings, and means for causing the variable voltage of the secondary windings to be either subtracted from or added to a fixed voltage obtained from the regulating transformer.

4. In a control system, in combination, a regulating transformer having a plurality of taps on the high tension winding thereof, a plurality of buck-boost transformers having primary windings and secondary windings, a plurality of tap-changing switches operable in sequential relation to connect said primary windings to said high tension taps in a predetermined sequence to vary the voltage of the secondary windings, and switching means for reversing the polarity of the buck-boost transformers to cause the variable voltage of their secondary windings to be either subtracted from or added to a fixed voltage.

5. In a control system, in combination, a regulating transformer having a plurality of taps on the high tension winding thereof, a plurality of buck-boost transformers having primary windings and secondary windings, a plurality of tap-changing switches operable in sequential relation to connect said primary windings to said high tension taps in a predetermined sequence to vary the voltage of the secondary windings, and switching means for reversing the polarity of the buck-boost transformers to cause the variable voltage of their secondary windings to be either subtracted from or added to a fixed voltage obtained from the regulating transformer.

6. In a control system, in combination, a regulating transformer having a primary winding and a secondary winding, a plurality of taps on the primary winding, a plurality of buck-boost transformers having primary windings and secondary windings, a plurality of tap-changing switches operable in sequential relation to connect the primary windings of the buck-boost transformers to said taps in a predetermined sequence, and means for causing said secondary windings to be connected either in differential-series or in cumulative series relation.

7. In a control system, in combination, a regulating transformer having a primary winding and a secondary winding, a plurality of taps on the primary winding, a plurality of buck-boost transformers having primary windings and secondary windings, a plurality of tap-changing switches operable in sequential relation to connect the primary windings of the buck-boost transformers to said taps in a predetermined sequence, and means for reversing the polarity of the buck-boost transformers to cause the variable voltage of their secondary windings to be either subtracted from or added to the voltage of the secondary winding of the regulating transformer.

8. In a control system, in combination, a regulating transformer having a primary winding and a secondary winding, a plurality of taps on the primary winding, a plurality of buck-boost transformers having primary windings and secondary windings, a plurality of tap-changing switches operable in sequential relation to connect the primary windings of the buck-boost transformers to said taps in a predetermined sequence, and means for changing the connections of the buck-boost transformers to the regulating transformer to cause said secondary windings to be either in differential-series or in cumulative-series relation.

9. In a control system, in combination, a regulating transformer having a primary winding and a secondary winding, a plurality of taps on the primary winding, a plurality of buck-boost transformers having primary windings and secondary windings, a plurality of tap-changing switches operable in sequential relation to connect the primary windings of the buck-boost transformers to said taps in a predetermined sequence, switching means for changing the connections of the primary windings of the buck-boost transformers, and additional switching means for reversing the polarity of said buck-boost transformers thereby causing said secondary windings to be either in differential-series or in cumulative-series relation.

10. In a control system, in combination, a regulating transformer having a plurality of taps thereon, an additional transformer connected in parallel-circuit relation with the regulating transformer, a plurality of buck-boost transformers having primary windings and secondary windings, a plurality of tap-changing switches operable in sequential relation to connect said primary windings to said taps in a predetermined sequence, and means for causing the voltage of said secondary windings to be either subtracted from or added to a fixed voltage obtained from said additional transformer.

LLOYD J. HIBBARD.